US009626683B2

(12) United States Patent
Gorodyansky et al.

(10) Patent No.: US 9,626,683 B2
(45) Date of Patent: Apr. 18, 2017

(54) METHOD AND SYSTEM FOR ADVANCED MESSAGING

(75) Inventors: David Gorodyansky, Sunnyvale, CA (US); Scott Lewis, Palatine, IL (US)

(73) Assignee: ANCHORFREE, INC., Menlo Park, CA (US)

( * ) Notice: Subject to any disclaimer, the term of this patent is extended or adjusted under 35 U.S.C. 154(b) by 823 days.

(21) Appl. No.: 11/684,560

(22) Filed: Mar. 9, 2007

(65) Prior Publication Data

US 2007/0162598 A1 Jul. 12, 2007

Related U.S. Application Data

(63) Continuation-in-part of application No. 11/471,247, filed on Jun. 19, 2006, and a continuation-in-part of application No. 11/291,442, filed on Nov. 30, 2005, and a continuation-in-part of application No. 11/291,688, filed on Nov. 30, 2005, and a continuation-in-part of application No. 11/292,187, filed on Nov. 30, 2005.

(60) Provisional application No. 60/683,441, filed on May 20, 2005.

(51) Int. Cl.
G06Q 30/02 (2012.01)
(52) U.S. Cl.
CPC .................................. *G06Q 30/02* (2013.01)
(58) Field of Classification Search
CPC G06Q 30/0241; G06Q 30/02; H04L 67/2819; G06F 17/30058; G06F 15/173
USPC ................................................ 709/224–229
See application file for complete search history.

(56) References Cited

U.S. PATENT DOCUMENTS

| 5,835,061 | A | 11/1998 | Stewart |
| 5,948,061 | A | 9/1999 | Merriman et al. |
| 6,285,985 | B1 * | 9/2001 | Horstmann ..................... 705/14 |
| 6,317,761 | B1 | 11/2001 | Landsman et al. |
| 6,452,498 | B2 | 9/2002 | Stewart |
| 6,539,375 | B2 | 3/2003 | Kawasaki |

(Continued)

OTHER PUBLICATIONS

International Search Report dated Feb. 28, 2008 for International Application No. PCT/US06/07166.

(Continued)

*Primary Examiner* — Evans Desrosiers
(74) *Attorney, Agent, or Firm* — TransPacific Law Group; Pavel I. Pogodin, Esq.

(57) ABSTRACT

An implementation of the inventive concept enables an outside entity to alter user's internet experience on a system-wide level. Specifically, inventive system enables a merchant, a distributor or any other entity to send contextually-relevant messages directly to the user's computer. Upon the receipt of the messages by the controller application residing on the user's computer, the messages are shown to the user by being incorporated into representation of various resources viewed by the user. For example, the received messages are incorporated into web pages viewed by the user by means of code injection. This way, the merchant, distributor or any other entity may provide targeted advertising to the user in a contextually relevant manner. Specifically, the controller application residing on the user's computer may detect requests for specific resources issued by the user in accordance with a predetermined criteria and incorporate the aforesaid received messages into those selected resources.

25 Claims, 5 Drawing Sheets

(56) References Cited

U.S. PATENT DOCUMENTS

| | | | |
|---|---|---|---|
| 6,754,833 | B1 | 6/2004 | Black et al. |
| 6,757,661 | B1* | 6/2004 | Blaser .................... G06Q 30/02 |
| | | | 705/14.54 |
| 6,782,375 | B2 | 8/2004 | Abdel-Moneim et al. |
| 6,859,833 | B2 | 2/2005 | Kirsch et al. |
| 6,895,387 | B1* | 5/2005 | Roberts et al. ................. 705/14 |
| 6,895,406 | B2 | 5/2005 | Fables et al. |
| 2001/0011264 | A1 | 8/2001 | Kawasaki |
| 2002/0024532 | A1 | 2/2002 | Fables et al. |
| 2002/0069105 | A1* | 6/2002 | do Rosario Botelho ............ G06F 17/30867 |
| | | | 705/14.53 |
| 2002/0099605 | A1 | 7/2002 | Weitzman et al. |
| 2003/0014403 | A1 | 1/2003 | Chandrasekar et al. |
| 2003/0023687 | A1 | 1/2003 | Wolfe |
| 2003/0028451 | A1 | 2/2003 | Ananian |
| 2003/0046161 | A1 | 3/2003 | Kamangar et al. |
| 2003/0216930 | A1 | 11/2003 | Dunham et al. |
| 2004/0039807 | A1 | 2/2004 | Boveda De Miguel et al. |
| 2004/0059708 | A1 | 3/2004 | Dean et al. |
| 2004/0215515 | A1 | 10/2004 | Perry |
| 2004/0224662 | A1 | 11/2004 | O'Neil et al. |
| 2004/0249713 | A1 | 12/2004 | Gross |
| 2005/0076014 | A1 | 4/2005 | Agarwal et al. |
| 2005/0080771 | A1 | 4/2005 | Fish |
| 2005/0097107 | A1 | 5/2005 | Burt et al. |
| 2005/0097188 | A1 | 5/2005 | Fish |
| 2005/0097204 | A1 | 5/2005 | Horowitz et al. |
| 2005/0131762 | A1 | 6/2005 | Bharat et al. |
| 2005/0149396 | A1 | 7/2005 | Horowitz et al. |
| 2005/0222989 | A1 | 10/2005 | Haveliwala et al. |
| 2006/0059043 | A1 | 3/2006 | Chan et al. |
| 2006/0059044 | A1 | 3/2006 | Chan et al. |
| 2006/0136372 | A1* | 6/2006 | Schunemann ......... G06Q 30/02 |

OTHER PUBLICATIONS

International Search Report dated Sep. 9, 2008 for International Application No. PCT/US07/14976.

International Search Report dated Sep. 27, 2007 for International Application No. PCT/US06/07167.

Turker, Denis, "The Optimal Design of A Search Engine from an Agency Theory Perspective", In Working Papers of the Institute for Broadcast Economics, Article No. 125565, 22 pages, Publication Date: Aug. 2004, Retrieved from the Internet: <URL: http://www.uni-koeln.de/wiso-fak/rundfunk/pdfs/19104.pdf>.

International Search Report dated Sep. 28, 2008 for International Application No. PCT/US06/07031.

Zhu, Xiaolan et al., "Incorporating quality metrics in centralized/distributed information retrieval on the World Wide Web", In Proceedings of the 23$^{rd}$ Annual International ACM SIGIR Conference on Research and Development in Information, Athens, Greece, pp. 288-295, 2000, Retrieved from the Internet: <URL: http://www.ittc.ku.edu/obiwan/publications/papers/sigir2000susan.pdf>.

International Search Report dated Nov. 28, 2007 for International Application No. PCT/US06/46149.

Newcomb, Kevin, "Google Seeks Patent for Targeting Ads on Wi-Fi Hotspots," *ClickZ Internet Advertising News*, Mar. 24, 2006, Incisive Interactive Marketing LLC, www.clickz.com/news/print.php/3593971.

Fleishman, Glenn, "Google's Wi-Fi Patent May Face Wayport Challenges," *Wi-Fi Networking News*, Mar. 29, 2006, https://wifinetnews.com/archives/006431.html.

* cited by examiner

METHOD AND SYSTEM FOR ADVANCED MESSAGING

CROSS-REFERENCE TO RELATED APPLICATIONS

This patent application claims benefit of and is a continuation in part of U.S. patent application Ser. No. 11/471,247, filed Jun. 19, 2006, U.S. patent application Ser. No. 11/291,442, filed Nov. 30, 2005; U.S. patent application Ser. No. 11/291,688, filed Nov. 30, 2005; and U.S. patent application Ser. No. 11/292,187, filed Nov. 30, 2005, which claims benefit of U.S. Provisional Patent Application Ser. No. 60/683,441, filed May 20, 2005; the disclosures of which are incorporated herein by reference in their entirety.

DESCRIPTION OF THE INVENTION

Field of the Invention

The present invention relates generally to Internet technology and more specifically to techniques for code injection and/or enabling contextual messaging and/or targeted advertising of goods and services.

Description of the Related Art

In many cases, it is desirable to permit a third party to instantly contact a user regarding the web resource which is currently being viewed by him or her. For example, if a user views a merchant's web page advertising product for sale for a specified price, a competitor merchant may desire to send a message to the user offering a lower price for the same or similar product.

In accordance with the existing technology, the third party competitor merchant may either send an email message to the user or display a pop-up window. However, the user may not check the email until after the purchase has already been completed. In addition, pop-ups are generally annoying to users and, for this reason, many users use pop-up blockers to prevent all pop-up messages. Therefore, the third party merchant may not communicate with the user in a timely manner in order to alter the shopper's buying decision. In addition, in order to achieve its goal or altering the user's shopping decision, the information provided by the third party merchant to the user must be highly relevant and targeted, which is not the case for most banner ads displayed on various Internet sites.

Accordingly, the existing technology does not enable a third party to timely and effectively communicate with the user regarding web resource which is currently being viewed by the user with highly relevant, targeted information. Therefore it would be desirable to have a system, which would enable such communication mode.

SUMMARY OF THE INVENTION

The inventive methodology is directed to methods and systems that substantially obviate one or more of the above and other problems associated with conventional techniques for messaging and targeted advertising of goods and services.

In accordance with one embodiment of the invention, there is provided a method and an associated computer system and a computer programming product implementing the aforesaid method. The aforesaid method involves collecting information on online activities of a user; indexing the collected information on online activities of a user; and using the collected information to inject a code into a resource to be viewed by the user.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

An embodiment of the inventive concept enables an outside entity to alter user's internet experience on a system-wide level. Specifically, an embodiment of the inventive system enables a merchant, a distributor or any other entity to send contextually-relevant messages directly to the user's computer. Upon the receipt of the messages by the controller application residing on the user's computer, the messages are shown to the user by being incorporated into representation of various resources viewed by the user. For example, in an embodiment of the inventive methodology, the received messages are incorporated into web pages viewed by the user by means of code injection. This way, the merchant, distributor or any other entity may provide targeted advertising to the user in a contextually relevant manner. Specifically, the controller application residing on the user's computer may detect user's requests for specific resources in accordance with a predetermined criteria and incorporate the aforesaid received messages into those requested resources. In an exemplary embodiment, the controller application may detect when the user requests to view a website of a specific merchant and display a comparative advertising material of a competitor of the aforesaid merchant. To this end, the application may issue a request for an appropriate advertising material from the server operated by the competitor. Various exemplary embodiment of the inventive methodology will now be discussed in more detail.

Figure 1:
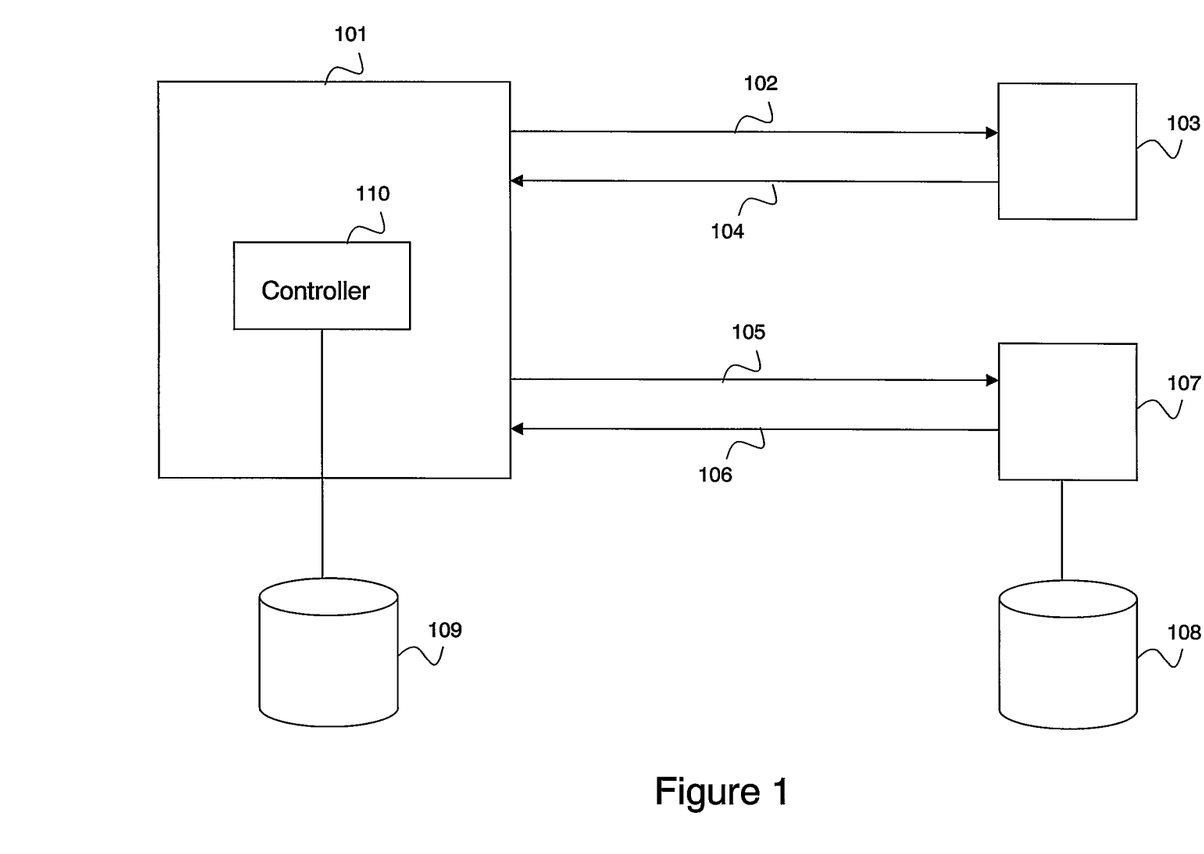
FIG. 1 illustrates a schematic diagram of one embodiment of a system 100 in accordance with the present invention.

A schematic diagram of one embodiment of a system 100 in accordance with the present invention is illustrated in FIG. 1. Specifically, a user operating a computer system 101 issues a request 102 for a target internet resource to a first server 103 operated, for example, by a first Internet merchant. To this end, the user's computer 101 as well as the first server 103 are interconnected via a network, such as Internet. In response, the first server 103 returns the target internet resource 104 to the user's computer. The target internet resource 104 may be a web page, a download, a streaming transmission or any other type of resource accessible over the Internet. As would be appreciated by those of skill in the art, the inventive methodology is not limited to any specific resource that may be used to provide the received messages to the user.

The user's computer executes a resident controller program 110, which detects the user's request for the target internet resource 104. In an embodiment of the invention, the resident controller program 110 is executed by the operating system of the user computer in a background execution mode and becomes active when request for new web resource is detected. The controller application 110 may detect the request for internet resource using the internet resource detection criteria stored in data structure 109, which is located on the user's computer and could be updated remotely. The data structure 109 may be a database, a configuration file, or any other storage structure. The internet resource detection criteria may include one or more rules identifying the internet resource to be detected. For example, the target internet resource may be detected based on the location thereof in the Internet, as described by the uniform resource locator (URL) of the resource. Specifically, requests for internet resources located on a specific website or within specific domain may be detected. Additionally or alternatively, the requests for internet resources may be selected based on presence or absence of a specific keyword or key phrase within the target resource. For example, the controller application 110 may be configured to detect when user accesses a web page having phrase "Apple ipod."

The data structure 109, stored on the user's computer, may also store information about various online activities of the user. Specifically, the controller application 110 may collect information on websites visited by the user as well as products that the user has viewed online. In addition, the controller application 110 may store in the data structure 109 information on user's music downloads, keywords appearing in the user's emails or chats and the like information.

Once the user's access to the appropriate internet resource has been detected by the controller application 110, the controller application 110 issues a request 105 to the second server 107, which is also connected to the global network (e.g. Internet) and operated, for example, by a second Internet merchant. Upon the receipt of the request 105, the second server 107 provides a response 106 to the controller application 101 via the network (not shown). The response 106 may contain information which is to be shown to the user. For example, the information incorporated in the response 106 may include a comparative advertisement for a product, which is the same or related to the product that the user is currently viewing online. To this end, the second server may have a data storage 108 storing various advertising materials to be provided to the users, which is accessed time to time by the second server 107. The data storage 108 may be implemented in a form of a database, a table or a file, or using any other suitable implementation.

The request 105 may also include other information, such as information on the user activities online, which is collected by the controller program 110 and stored in the data structure 109. This information allows the second server 107 to provide more targeted advertising materials to be shown to the user of the computer system 101. For example, the controller application 110 may send to the server 107 information on all Apple products viewed by the user in the previous 30 days. In another example, the controller application 110 may send to the server 107 information on all web pages containing keyword "Apple" and visited by the user.

When the response 106 is received by the controller application 110, all or part of the information contained in that response is shown to the user. In one exemplary embodiment, the information contained in the response is incorporated into web resources presently viewed by the user bay way of a code injection. The code injection is well known to persons of skill in the art. Specifically, one embodiment of the inventive system uses browser independent HTML code injection provided by a universal implementation of GreaseMonkey package called SlickChimp. Information about the aforesaid GreaseMonkey package may be obtained under URL http://greasemonkey.mozdev.org. In one specific example, in response to request 105, the second server 107 provides to the controller application 110 an HTML code for a competitor's advertising of the product in a requested merchant's web page which is about to be viewed by the user. The received code is injected into the HTML code of the requested merchant's web page and subsequently shown to the user.

It should be noted that in one embodiment of the invention, the controller application 110 is not specific to any web browser or any other software. The controller application is executed by the operating system and may modify the web resources viewed by the user using any of the system's tools.

Figure 2:
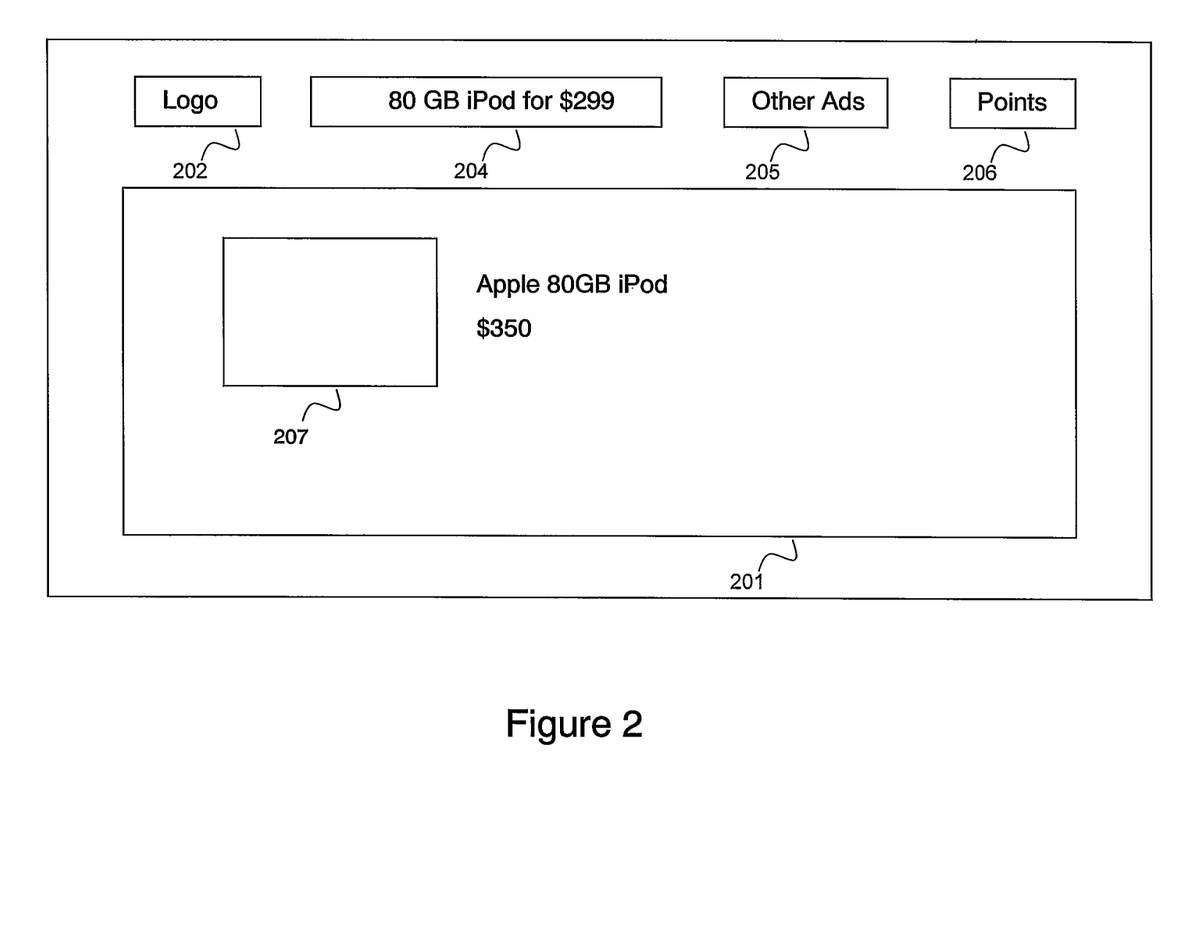
FIG. 2 illustrates an example of web page representation generated by the inventive algorithm implemented by the controller application.

FIG. 2 illustrates an exemplary web page representation 200 generated by the inventive algorithm implemented by the controller application 110. Prior to display of the shown web page to the user, the user made a request for the web page 201, by, for example, typing the appropriate URL into the browser or by activating an appropriate web link. In the example shown in FIG. 2, the requested resource is a merchant's page advertising 80 GB Apple's ipod for sale for $350. After the controller application 110 detected the user's request, it issued the request 105 to the second server 107, which responds with the information to be shown to the user. This information is incorporated into the web page representation shown to the user by way of the aforesaid HTML code injection. Specifically, the web page representation 200 in addition to the representation of the merchant's page 201, requested by the user, also incorporates competitor's logo 202, competitor's advertisement 204 for the product shown in the requested page 201 (80 Gb Apple iPod), other advertising materials 205, as well as information 206 on user's rewards or points with the competitor.

If the user actives any of the shown items 202-206, the user would be take to appropriate web resource. For example, if the user activated the competitor's logo 202, the user would be taken to the front page of the competitor's website. In the user activates the competitor's advertising 204, the user would be shown the competitor's web page advertising the corresponding product for sale. If the user activates the item 206, the user will be shown his or her rewards account balance and/or other points or rewards information.

Figure 3:
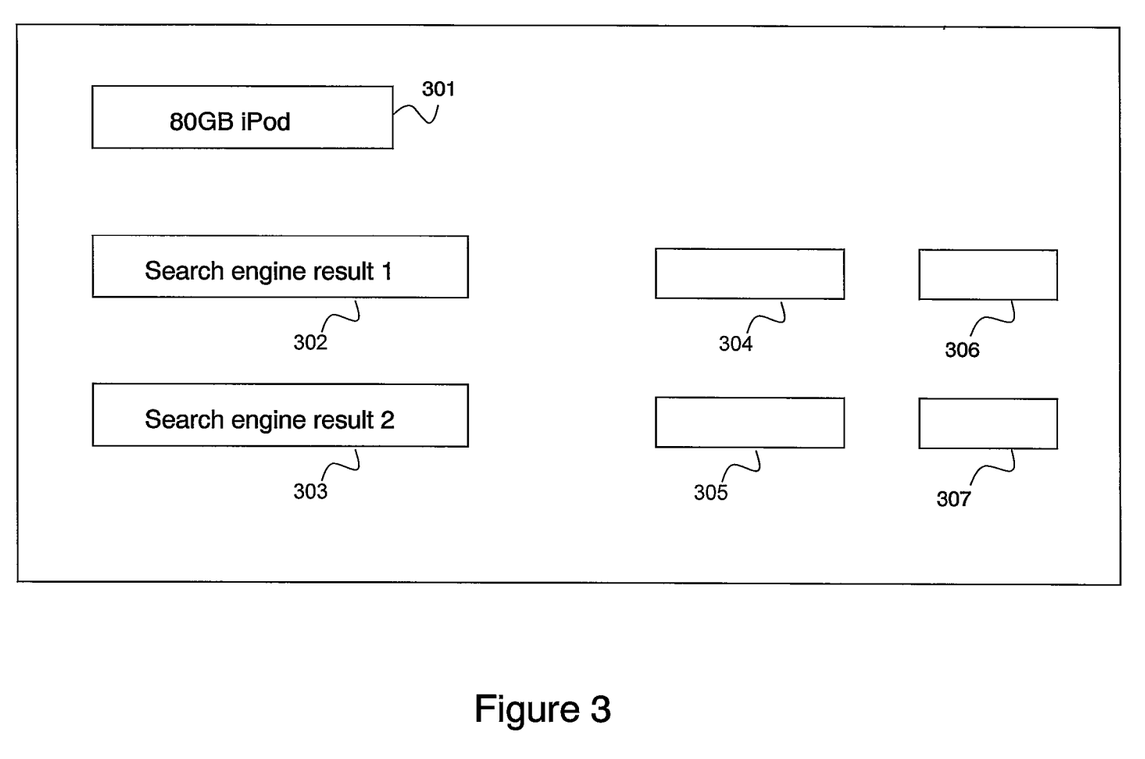
FIG. 3 illustrates another example of web page representation generated by the inventive algorithm implemented by the controller application.

FIG. 3 illustrates another example of web page representation 300 generated by the inventive algorithm implemented by the controller application 110. In this example, the user uses a search engine residing on the first server to search for a product using a search query 301. In the specific example shown in FIG. 3, the user has typed a search query for 80 GB apple iPod. The user's query is detected by the controller application, which sends the request 105 to the second server 107 and receives response 106 with information to be shown to the user. In response to the user's query 301, the search engine residing on the first server returns search results, which are shown to the user. The controller application residing on user's computer receives the response 106 with information to be shown to the user from the second server 107 and inject this information into the search results provided by the search engine by way of HTML code injection described hereinbefore. The web page representation shown in FIG. 3, shown to the user, includes search engine results 302 and 303, as well as information 304-307, injected by the controller application. In the specific example, the information 304 and 305 may be featured advertisements for products in the search results 302 and 303, obtained from a competing search engine. The information 306 and 307 may include a link to product results from a competing marketplace vendor. If the user activates the information items 304-307, he or she will be taken to the appropriate web resource, such as list of corresponding products by the aforesaid competing marketplace vendor.

Figure 4:
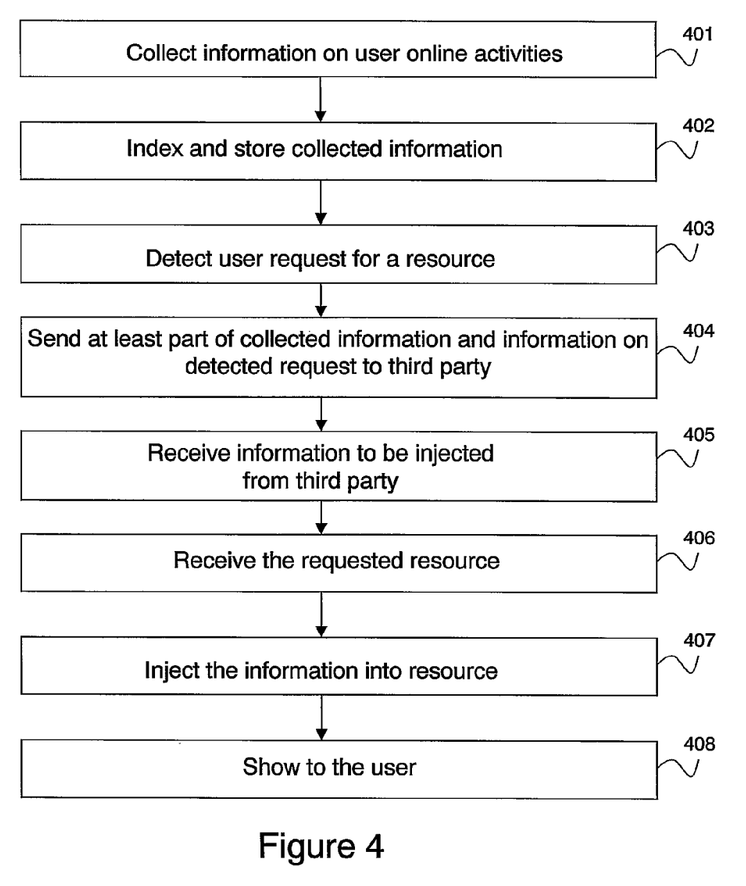
FIG. 4 illustrates an exemplary operating sequence of an embodiment of the inventive messaging technique.

FIG. 4 illustrates an exemplary operating sequence 400 of an embodiment of the inventive messaging technique. At step 401, the inventive controller application 110 collects various information on online activities of the user. The collected information may include information on websites and other resources visited by the user as well as information products reviewed by the user. At step 402, the inventive controller application 110 indexes and stores the collected information on the user's computer. The stored information may be encrypted for privacy using any known encryption technique. In one embodiment, the collected information is stored and protected on the user's computer using the techniques described in the aforesaid U.S. patent application Ser. No. 11/471,247, incorporated herein by reference in its entirety. In another embodiment, this information is accessible only to the inventive controller application 110 and is not provided to outside entities. At step 403, the controller application 110 detects user's request for a target web resource. The target resource may be, for example, a merchant web page or a search engine page. It should be noted that the inventive technique is not limited to any specific resource or any specific request. Instead, any user-initiated event may be detected. For example, instead of detecting the user's request for a web page or a search engine, the controller application 110 may detect presence of a specified keyword I user's email or online chat conversation. After the specified event has been detected, the controller application 110 send the information on the detected event as well as at least a portion of the collected information on user's online activities to the second server 107, see step 404. In the shown example, the detected event is a user's request for a web resource. At step 405, in response to the data sent at step 404, the controller application 110 receives the information to be shown to the user from the second server 107. If a resource was requested, the requested resource is received at step 406. At step 407, the received information is injected into the resource. This step may be performed by way of HTML code injection into a web page of the resource of otherwise. For example, a message may be placed within a chat conversation involving the user. Finally, at step 408, the resource with the injected information is shown to the user.

It should be noted that the controller application may be specifically designed to show advertising materials of a specific vendor and may be made available for download from the vendor's website. Specifically, a merchant may distribute an controller application which would look for user's visit's to merchant's competitor's websites and offer advertising materials of comparable products from the merchant.

Figure 5:
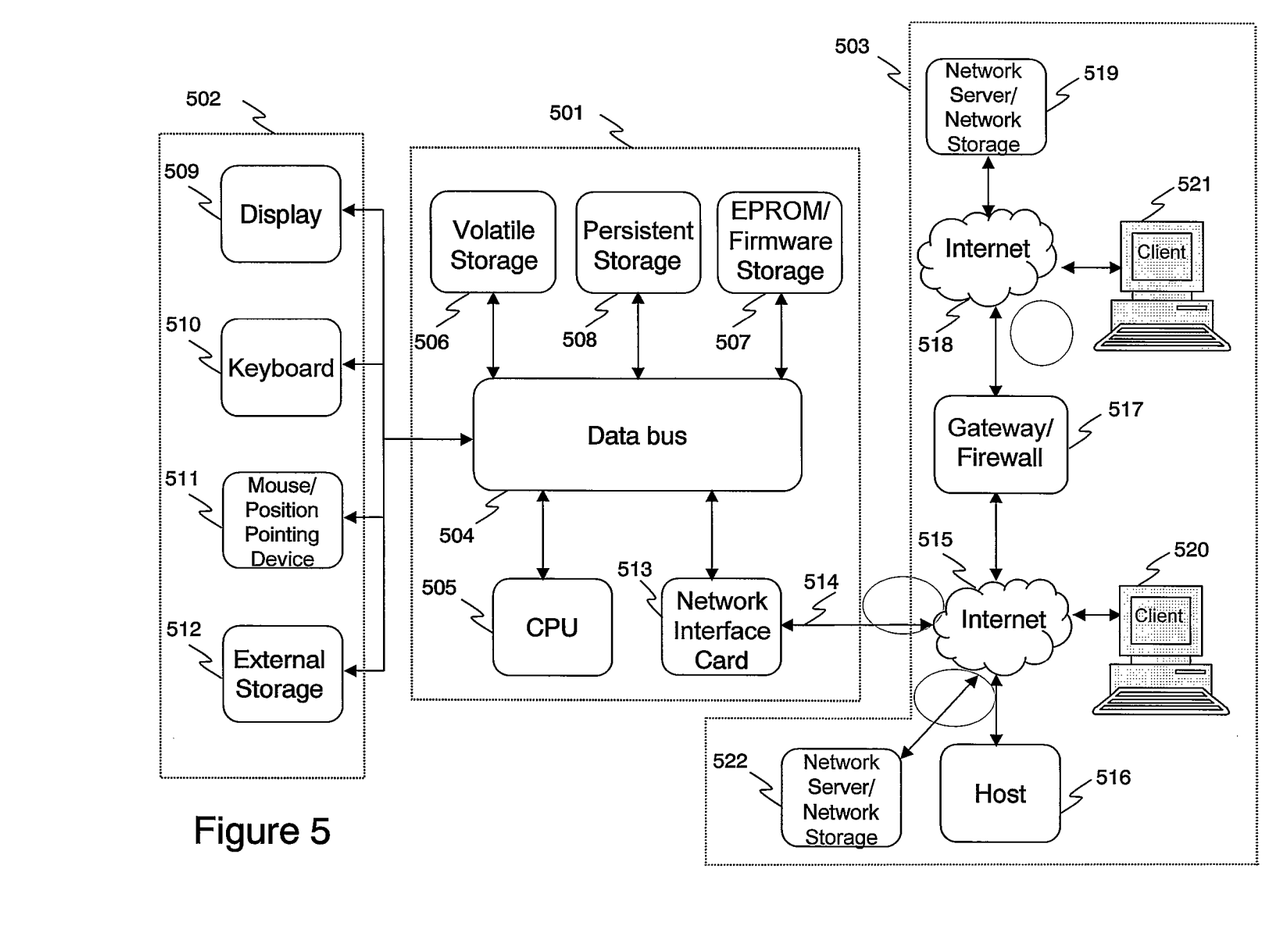
FIG. 5 illustrates an exemplary embodiment of a computer platform upon which the inventive system may be implemented.

FIG. 5 is a block diagram that illustrates an embodiment of a computer/server system 500 upon which an embodiment of the inventive methodology may be implemented. The system 500 includes a computer/server platform 501, peripheral devices 502 and network resources 503.

The computer platform 501 may include a data bus 504 or other communication mechanism for communicating information across and among various parts of the computer platform 501, and a processor 505 coupled with bus 501 for processing information and performing other computational and control tasks. Computer platform 501 also includes a volatile storage 506, such as a random access memory (RAM) or other dynamic storage device, coupled to bus 504 for storing various information as well as instructions to be executed by processor 505. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 501 for storing information and instructions.

Computer platform 501 may be coupled via bus 504 to a display 509, such as a cathode ray tube (CRT), plasma display, or a liquid crystal display (LCD), for displaying information to a system administrator or user of the computer platform 501. An input device 510, including alphanumeric and other keys, is coupled to bus 501 for communicating information and command selections to processor 505. Another type of user input device is cursor control device 511, such as a mouse, a trackball, or cursor direction keys for communicating direction information and command selections to processor 504 and for controlling cursor movement on display 509. This input device typically has two degrees of freedom in two axes, a first axis (e.g., x) and a second axis (e.g., y), that allows the device to specify positions in a plane.

An external storage device 512 may be connected to the computer platform 501 via bus 504 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 508. Volatile media includes dynamic memory, such as volatile storage 506. Transmission media includes coaxial cables, copper wire and fiber optics, including the wires that comprise data bus 504. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on the data bus 504. The bus 504 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 504. Communication interface 513 provides a two-way data communication coupling to a network link 514 that is connected to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 513 typically provides data communication through one or more networks to other network resources. For example, network link 514 may provide a connection through local network 515 to a host computer 516, or a network storage/server 517. Additionally or alternatively, the network link 513 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 514 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 514 and communication interface 513. In the Internet example, when the system 501 acts as a network server, it might transmit a requested code or data for an application program running on client(s) 520 and/or 521 through Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution. In this manner, computer system 501 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized messaging system. It is intended that the specification and examples be considered as exemplary only, with a true scope and spirit of the invention being indicated by the following claims.

What is claimed is:

1. A method comprising:
  collecting, at a client computer directly accessed by a user, the client computer being in communication with a server, information on online activities of the user, the information on online activities of the user comprising at least information on a plurality of network resources accessed by the user;
  indexing, at the client computer, the collected information on online activities of the user and storing the indexed information on online activities of the user on the client computer, wherein the stored information is encrypted;
  storing a plurality of user request selection criteria in a memory device of the client computer, the plurality of user request selection criteria being remotely updatable;
  receiving a request from the user for a network resource;
  comparing, on the client computer, the received user request with the user request selection criteria and selecting, on the client computer, the received user request if the received user request matches the user request selection criteria;
  using the indexed collected information to inject an HTML code into the network resource to be viewed by the user, the network resource received from the server based on a command sent to the server by the client computer, the command being based on the selected user request; and
  displaying both the network resource and the HTML code injected on the client computer to the user in the same single web browser window, wherein the injecting of the HTML code is performed on the client computer, wherein the HTML code comprises an advertising material and wherein the information on online activities of the user is prevented from being sent outside of the client computer directly accessed by the user to preserve privacy of the user.

2. The method of claim 1, wherein using the indexed collected information comprises:
  obtaining the HTML code to be injected into the network resource requested by the user based on the selected user request.

3. The method of claim 2, wherein using the indexed collected information further comprises:
  sending information on the selected user request from the user to a second server;
  sending at least a portion of the indexed collected information on online activities of the user to the second server; and
  receiving the HTML code to be injected from the second server in response to the sent information.

4. The method of claim 1, further comprising presenting the network resource with the injected HTML code to the user, wherein the request from the user for predetermined detection criteria stored on the client computer.

5. The method of claim 1, wherein the network resource is selected from a group consisting of a web page, a download and a streaming transmission.

6. The method of claim 1, wherein the request from the user for the network resource is selected based on a content of the network resource.

7. The method of claim 1, wherein the network resource requested by the user is a merchant's web page for a product.

8. The method of claim 7, wherein the HTML code comprises competitor's advertising information for the product.

9. The method of claim 7, wherein the HTML code comprises a link to the product's page in a competitor's website.

10. The method of claim 1, wherein the network resource requested by the user is a web search result page for a product provided to the user in response to a user's query to a search engine.

11. The method of claim 10, wherein the HTML code comprises advertising information for the product from a competitor search engine.

12. The method of claim 10, wherein the HTML code comprises a link to the product's page in a competitor search engine website.

13. A computer programming product embodied in a non-transitory computer-readable medium, the computer programming product comprising computer instructions causing one or more processors executing the instructions to:
  collect, using a processing unit, at a client computer directly accessed by a user, the client computer being in communication with a server, information on online activities of the user, the information on online activities of the user comprising at least information on a plurality of network resources accessed by the user;
  index, at the client computer, the collected information on online activities of a user and store the indexed information on online activities of the user on the client computer, wherein the stored information is encrypted;
  store a plurality of user request selection criteria in a memory device of the client computer, the plurality of user request selection criteria being remotely updatable;
  receive a request from the user for a network resource;
  compare, on the client computer, the received user request with the user request selection criteria and selecting, on the client computer, the received user request if the received user request matches the user request selection criteria;
  use the indexed collected information to inject an HTML code into the network resource requested by the user, the network resource received from the server based on a command sent to the server by the client computer, the command being based on the selected user request; and
  displaying, using a display unit, both the network resource and the HTML code injected on the client computer to the user in the same single web browser window, wherein the injecting of the HTML code is performed on the client computer, wherein the HTML code comprises an advertising material and wherein the information on online activities of the user is prevented from being sent outside of the client computer directly accessed by the user to preserve privacy of the user.

14. The computer programming product of claim 13, wherein the use of the collected information comprises the HTML code to be injected into the network resource requested by the user based on the detected request.

15. The computer programming product of claim 14, wherein the use of the collected information further comprises:
sending information on the selected user request from the user to a second server;
sending at least a portion of the indexed collected information on online activities of the user to the second server; and
receiving the HTML code to be injected from the second server in response to the sent information.

16. The computer programming product of claim 13, wherein the computer instructions further cause the one or more processors to present the network resource is detected based on an address of the network resource and a predetermined detection criteria stored on the client computer.

17. The computer programming product of claim 13, wherein the network resource is selected from a group consisting of a web page, a download and a streaming transmission.

18. The computer programming product of claim 13, wherein the request from the user for the network resource is selected based on a content of the network resource.

19. The computer programming product of claim 13, wherein the network resource requested by the user is a merchant's page for a product.

20. The computer programming product of claim 19, wherein the HTML code comprises competitor's advertising information for the product.

21. The computer programming product of claim 19, wherein the HTML code comprises a link to the product's page in a competitor's website.

22. The computer programming product of claim 13, wherein the network resource requested by the user is a web search result page for a product provided to the user in response to a user's query to a search engine.

23. The computer programming product of claim 22, wherein the HTML code comprises advertising information for the product from a competitor search engine.

24. The computer programming product of claim 22, wherein the HTML code comprises a link to the product's page in a competitor search engine website.

25. A computer system comprising one or more central processing units (CPUs) and a memory unit storing a programming product, the computer programming product comprising computer instructions causing the one or more central processing units to:
collect, at a client computer directly accessed by a user, the client computer being in communication with a server, information on online activities of the user, the information on online activities of the user comprising at least information on a plurality of network resources accessed by the user;
index, at the client computer, the collected information on online activities of a user and store the indexed information on online activities of the user on the client computer, wherein the stored information is encrypted;
store a plurality of user request selection criteria in a memory device of the client computer, the plurality of user request selection criteria being remotely updatable;
receive a request from the user for a network resource;
compare, on the client computer, the received user request with the user request selection criteria and selecting, on the client computer, the received user request if the received user request matches the user request selection criteria;
use the indexed collected information to inject an HTML code into the network resource requested by the user, the network resource received from the server based on a command sent to the server by the client computer, the command being based on the selected user request; and
display both the network resource and the HTML code injected on the client computer to the user in the same single web browser window, wherein the injecting of the HTML code is performed on the client computer, wherein the HTML code comprises an advertising material and wherein the information on online activities of the user is prevented from being sent outside of the client computer directly accessed by the user to preserve privacy of the user.

* * * * *